Patented July 28, 1936

2,049,359

UNITED STATES PATENT OFFICE 2,049,359

METHOD OF PURIFYING SILICIC ACID

Werner Düsing, Berlin, and Johann Ensz, Berlin-Charlottenburg, Germany, assignors to General Electric Company, a corporation of New York No Drawing. Application October 25, 1933, Serial No. 695,212. In Germany November 11, 1932

2 Claims. (Cl. 23—182)

The present invention relates to methods of purifying silicic acid and is of particular advantage in the preparation of silicic acid used in the manufacture of ultra-violet transmitting glasses.

The compounds of titanium and iron are absorbent of ultra-violet rays and it is desirable that ultra-violet transmitting glass have as low a content as possible of these compounds. Attempts made to accomplish this result by treating the raw materials of the glass batch, particularly the sands and the quartzes, with a material, such as hydrochloric acid, in which these compounds are soluble have proven unsuccessful for not enough of the compound is removed from the raw material and as a result the ultra-violet transmission characteristics of the glasses made from materials treated in this manner are not as good as those of quartz.

The object of the present invention is to provide a process for producing raw materials from which ultra-violet transmitting glasses are made, by which such materials are rendered substantially free from the deleterious compounds of titanium and iron. The invention further consists in the new and novel features of operation and the new and original arrangements and combinations of steps in the process hereinafter described and more particularly set forth in the claims.

The invention attains its objects by producing the silicic acid by precipitation from commercial water glass solutions by acid. In this process the undesired impurities, that is the compounds of titanium and iron, are present in dissolved form and can be easily removed by treatment with acid whereas these impurities are present in a difficultly soluble form in the silicic acid used heretofor, are imbedded in the raw material and cannot be removed successfully by treatment with hydrochloric acid. The glass manufactured from raw materials produced according to this process has less than 0.005% of the titanium and iron impurities therein and the ultra-violet transmission characteristics of the glass are substantially unaffected by this small amount of impurity. The addition of reducing substances, such as zinc or carbon compounds, to the glass melts, essential in the manufacture of ultra-violet transmitting glasses heretofore, is not necessary where silicic acid produced in accordance with this invention is used.

Since the precipitated silicic acid is absorbent of titanium and iron compounds it is desirable that this material be subjected to treatment with dilute sulphuric acid which treatment is continued until the content of titanic acid and iron oxide in the glass made from the precipitated silicic acid is less than 0.005%. This process can be facilitated, when desired, by an oxidizing agent, such as hydrogen peroxide added to the dilute sulphuric acid. The oxidizing agent translates the titanium compounds into compounds which are more soluble than titanium itself.

The purification process can be facilitated still further by grinding the precipitated silicic acid before treating it with the dilute sulphuric acid.

The glasses made of the raw materials produced in accordance with the above described process have ultra-violet transmission characteristics in the wave lengths of ultra-violet of value in therapeutic work similar to the transmission characteristics of quartz.

Although we have set forth and described processes for producing our improved product, it is obvious that various changes may be made in the processes or in the separate steps thereof without modifying or changing the essential features and characteristics of the product produced and that such product remains substantially the same although modifications may be made in its appearance, texture and in its general form and characteristics.

What we claim as new and desire to secure by Letters Patent of the United States is:—

1. A process for producing the silicic acid useful in the manufacture of ultra-violet transmitting glass which consists in precipitating said silicic acid from commercial water glass containing titanic and iron oxides by the use of acids and washing the precipitated silicic acid with dilute sulphuric acid mixed with hydrogen peroxide until the titanic acid and iron oxide content of the silicic acid is less than 0.005%.

2. A process for producing the silicic acid useful in the manufacture of ultra violet transmitting glass which consists in precipitating said silicic acid from commercial water glass containing titanic and iron oxides by the use of acids, grinding the precipitated silicic acid and then washing the silicic acid with dilute sulphuric acid mixed with hydrogen peroxide until the titanic acid and iron oxide content of the silicic acid is less than 0.005%.

WERNER DÜSING.
JOHANN ENSZ.